United States Patent
Al-Negheimish et al.

(10) Patent No.: US 8,152,917 B2
(45) Date of Patent: Apr. 10, 2012

(54) METHOD FOR MANUFACTURING CONCRETE CONTAINING ELECTRIC ARC FURNACE DUST

(75) Inventors: Abdulaziz I. Al-Negheimish, Riyadh (SA); Rajeh Z. Al-Zaid, Riyadh (SA); Abdulrahman M. Alhozaimy, Riyadh (SA)

(73) Assignee: King Saud University, Riyadh (SA)

( * ) Notice: Subject to any disclaimer, the term of this patent is extended or adjusted under 35 U.S.C. 154(b) by 390 days.

(21) Appl. No.: 12/193,360

(22) Filed: Aug. 18, 2008

(65) Prior Publication Data
US 2010/0037803 A1 Feb. 18, 2010

(51) Int. Cl.
C04B 18/06 (2006.01)
C04B 18/08 (2006.01)
(52) U.S. Cl. .................................. 106/707; 106/716
(58) Field of Classification Search ................. 106/707, 106/716
See application file for complete search history.

(56) References Cited

U.S. PATENT DOCUMENTS
5,557,031 A * 9/1996 Al-Sugair et al. ............ 106/697
* cited by examiner Primary Examiner — Paul Marcantoni
(74) Attorney, Agent, or Firm — Lowe Hauptman Ham & Berner LLP

(57) ABSTRACT

A method for manufacturing concrete bodies or forms containing electric arc furnace dust in an amount of up to about 4% at elevated temperatures to provide concrete bodies is disclosed. The concrete bodies have improved compressive strength and slump retention capability. The method for producing the bodies includes the steps of providing pre-selected amounts of electric arc furnace dust, water, cement and aggregate. The electric arc furnace dust is mixed with water and then added to the cement and aggregate and mixed together at a temperature of about 32° C. and 45° C. to form a hot mixture. The hot mixture is added to a mold and cast at an elevated temperature to form a body with improved strength and slump retention characteristics.

9 Claims, 5 Drawing Sheets

US 8,152,917 B2

METHOD FOR MANUFACTURING CONCRETE CONTAINING ELECTRIC ARC FURNACE DUST

FIELD OF THE INVENTION

This invention relates to a method for manufacturing concrete bodies containing electric arc furnace dust (EAFD) at elevated temperatures to provide improved compressive strength and slump retention capability.

BACKGROUND FOR THE INVENTION

Electric arc furnace dust hereinafter referred to as "EAFD" is produced by the steel industry and is classified into two major categories. One category is dust that is produced from steel mills and the other is dust produced from steel foundries. Typically EAFD is obtained from "bag houses" but may be recovered from cyclones and electro-static precipitators.

A number of methods have been used to extract valuable components, as for example Zinc, from EAFD. However, it is considered to be more economical to use the EAFD in its raw state. One problem is that even after the recovery of some of the metals, the remaining dust must be disposed of in a disposal site or the like.

One approach to reduce the disposal cost for EAFD is disclosed in our earlier U.S. Pat. No. 5,557,031, entitled "Use of Electric Arc Furnace By-Product in Concrete" that was developed at the Department of Civil Engineering, King Saud University, Riyadh, Saudi Arabia. As disclosed therein, EAFD may be used as a partial replacement or additive for cement to provide retardation and enhance properties including corrosion inhibiting in concrete bodies. As stated in the patent, under appropriate conditions EAFD confers enhanced properties to the end product. Therefore, EAFD can be disposed of in an environmentally more attractive manner. Moreover, benefits result not only from savings in cement use, but also from savings in the operation of electric arc furnaces and by reducing EAFD disposal costs. The U.S. Pat. No. 5,557,031 is incorporated herein in its entirety by reference.

It has also been recognized that hot weather can cause problems in working with concrete and that such problems increase as temperatures rise. For example, it has been reported that it may be necessary to make adjustments to a concrete mix as the weather warms because an everyday mix can begin to perform differently as temperatures rise above 23° C. (75° F.). It has also been recognized that for hot weather concreting, hot weather is a combination of the following weather conditions; high ambient temperature, low relative humidity, solar radiation and wind.

In the Middle East and some parts of the United States ambient temperatures of about 32° C. to about 45° C. are frequently encountered during the summer months. For example, in 1913 in Death Valley, Calif. a temperature of 134° F. (56.6° C.) was recorded. Problems associated with extreme heat i.e. 32° C. (90° F.) to 40 or 45° C. (104°-113° F.) or greater include increased water demand, increased rate of slump loss, increased rate of setting, increased tendency for plastic-shrinkage cracking and increased difficulty in controlling entrained air content. For hardened concrete, the main problem is the decreased long-term strength.

Authorities in concrete technology such as those at the American Concrete Institute (ACI) and Portland Cement Association (PCA) recommend cooling concrete as low as possible in order to obtain good quality concrete in hot weather. In addition some specifications require that when placed, concrete should have a temperature of less than 29° C. (84° F.) to 32° C. (90° F.). Therefore, in areas of extreme temperature, ice or chilled water is added to a hydraulic cement, aggregate and water mix. Further, in adding ice, it is important to use crushed, shaved or chipped ice to ensure that all of the ice melts before mixing is completed. Reducing temperature of a concrete mix adds substantial cost to the process.

Set retarding/water-reducing admixtures are sometimes used to counteract some of the negative impacts of hot weather on fresh concrete, particularly the rapid setting caused by high temperatures. Water-reducing admixtures can help curb slump loss without effecting the water demand of the mix, however, chemical admixtures are conditional on cement type and require care in adjusting dosage. Admixtures that increase the bleeding rate can help counteract surface drying, but may also require additional consolidation after the majority of bleeding has subsided.

An early approach to a method for cementing in environments having elevated temperatures is disclosed in a U.S. Pat. No. 3,856,541 of Martin. As disclosed therein a water-soluble hydroxy carboxylic acid or salt thereof and boric acid or a water soluble salt thereof are mixed with an aqueous hydraulic cement slurry to increase the normal setting time. A water-soluble boron containing hydroxyl carboxylic acid or salt thereof can be substituted for the aforementioned mixture.

It is presently believed that a method in accordance with the present invention will provide a concrete with improved strength and slump retention capability, provide a more economical solution to a problem of concreting in a high temperature environment, increase the use of EAFD, thus leading to a clean environment and eliminate the need for chilled water or ice in concreting at elevated temperatures.

BRIEF SUMMARY OF THE INVENTION

In essence this invention contemplates a method for manufacturing concrete bodies containing a mass of arc furnace dust at elevated temperatures to provide bodies having improved compressive and slump retention capability. The method includes the steps of providing a mass of hydraulic cement, mass of aggregate, mass of electric arc furnace dust and a mass of water. The method also includes the steps of bringing the aggregate and water up to a temperature of between about 32° C. and about 45° C. and mixing the hydraulic cement, electric arc furnace dust, heated water and heated aggregate to form a heated mixture with a temperature of about 32° C.-45° C. In a preferred embodiment of the invention, the concrete is cast at an elevated temperature of about 32° C. to about 45° C.

A preferred embodiment of the invention also includes the step of mixing hydraulic cement and 2% EAFD and water The invention will now be described in connection with the accompanying drawings. Further in describing the invention all percentages indicated are by weight and in the discussions, the ASTM Standards have been employed wherever applicable or a different standard as specified. The meanings for the tests are not explained except where it is believed necessary.

DESCRIPTION OF THE PREFERRED EMBODIMENTS OF THE INVENTION

In connection with the present invention a few typical compositions of EAFD from the United States of America are given in Table 1.

TABLE 1

Typical compositon of EAFD

| | Analysis, % by weight | | |
|---|---|---|---|
| | Source A | Source B | Source C* |
| Iron | 35.0 | 32.8-72.9 | 29.6 |
| Chromium | 1.4 | 0.11-0.18 | — |
| Zinc | 3.1 | 3.9-10.3 | 26.4 |
| Lead | 0.93 | 2.1-2.4 | 2.6 |
| Cadmium | 0.04 | 0.04-0.06 | — |
| Calcium | 4.7 | 6.0-6.6 | 3.5 |
| Manganese | 6.2 | 3.5-5.4 | 3.5 |
| Magnesium | 3.7 | 1.6-2.1 | 1.8 |
| Sodium | 2.9 | 0.45-0.66 | 1.4 |
| Potassium | 0.94 | 0.8-1.0 | 0.8 |
| Aluminum | 0.40 | 0.22-0.35 | 0.2 |
| Copper | 0.20 | 0.1-0.2 | 0.3 |
| Silicon | 0 | 1.1-1.3 | 1.7 |

As shown in Table 1, various components are found in various proportions, however, the predominate components in common are iron and zinc. It has also been shown in the U.S. Pat. No. 5,557,031 ('031) patent that there is some variety in the EAFD. However, the components that affect the properties of the final concrete products are sufficiently present such that the EAFD may be used for the intended purpose with some adjustments as well known by those of ordinary skill in the art, e.g. relating zinc and the so-called pozzolanic components thereof.

As stated in the '031 patent, EAFD additions increase set retardation and thus confers a valuable property to cement when formed into concrete. However, it has now been found that concrete bodies made in accordance with the present invention have improved strength and slump retention capability. It has also believed that the increase in strength may lead to an increase in the use of EAFD in the manufacture of concrete products at elevated temperatures, thus leading to a cleaned environment.

Figure 1:
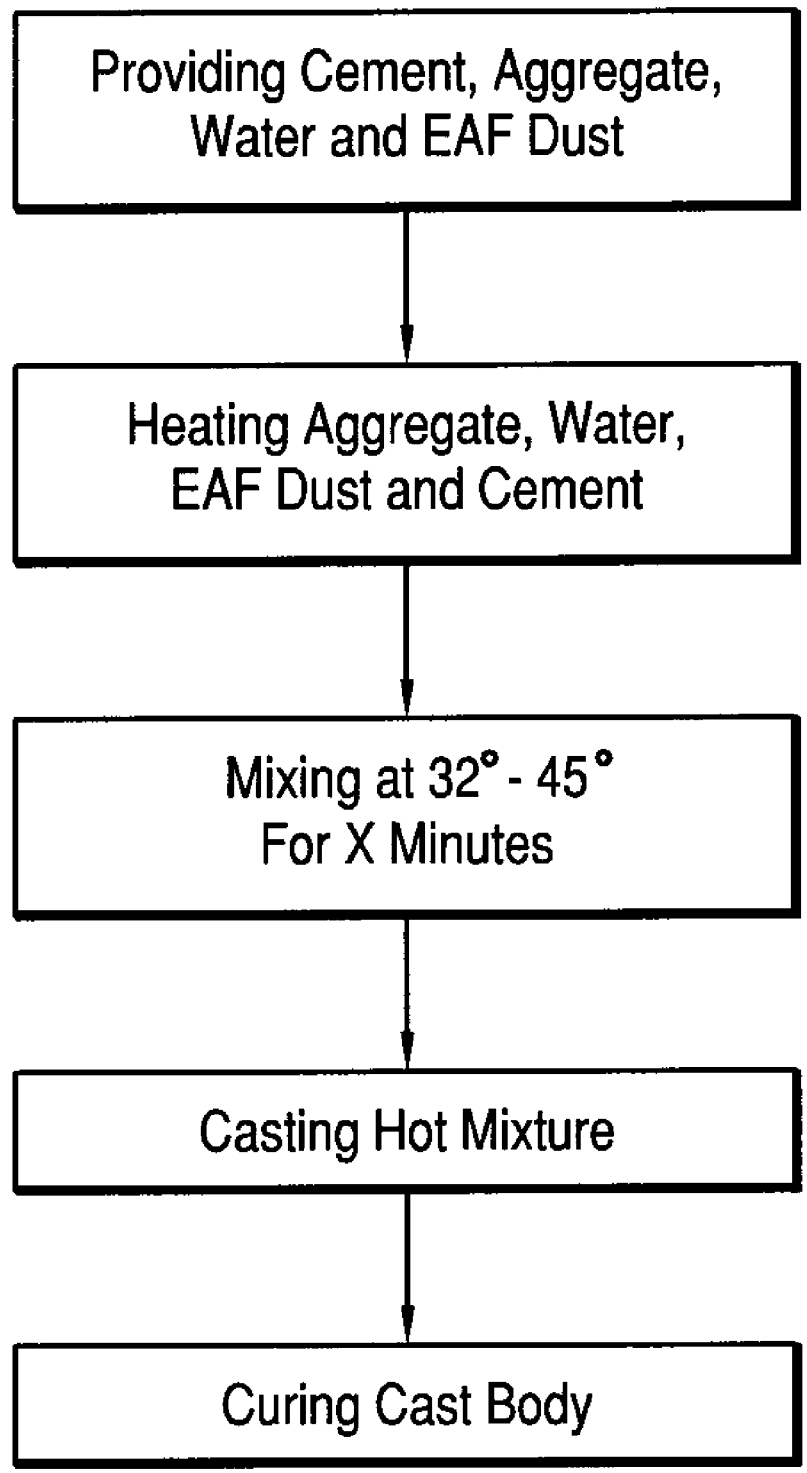
FIG. 1 is a flow chart illustrating a preferred embodiment of the invention.
Figure 2:
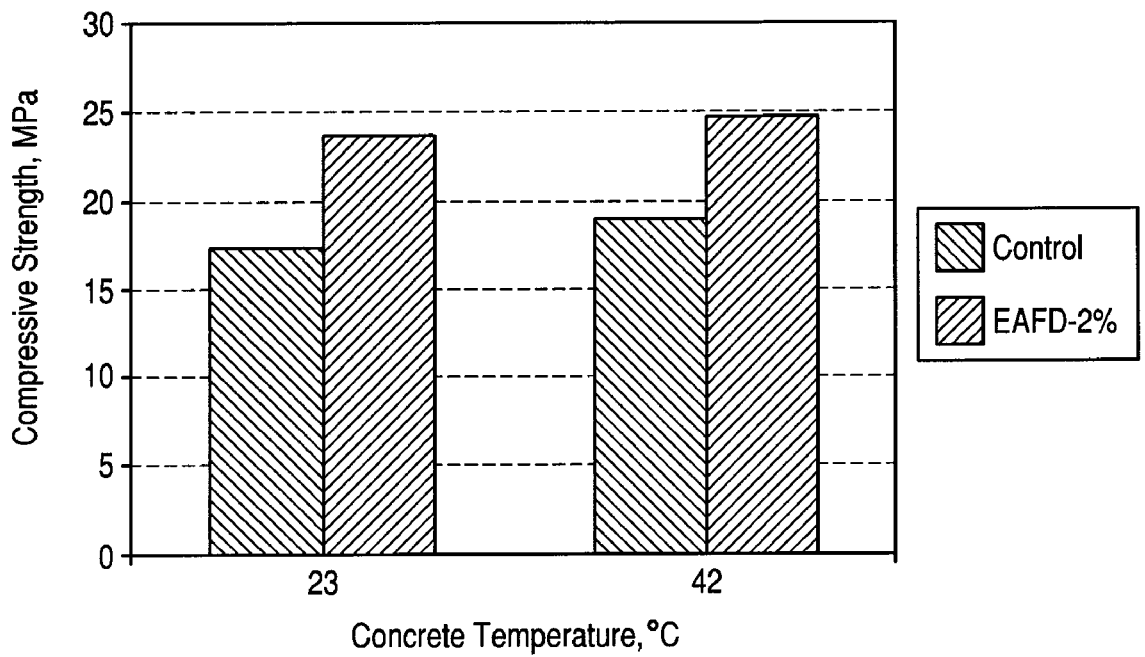
FIG. 2 is a graphical illustration showing the effect of temperature on the 7-day compressive strength of concrete cast with and without 2% Electric Arc Furnace Dust (EAFD)
Figure 3:
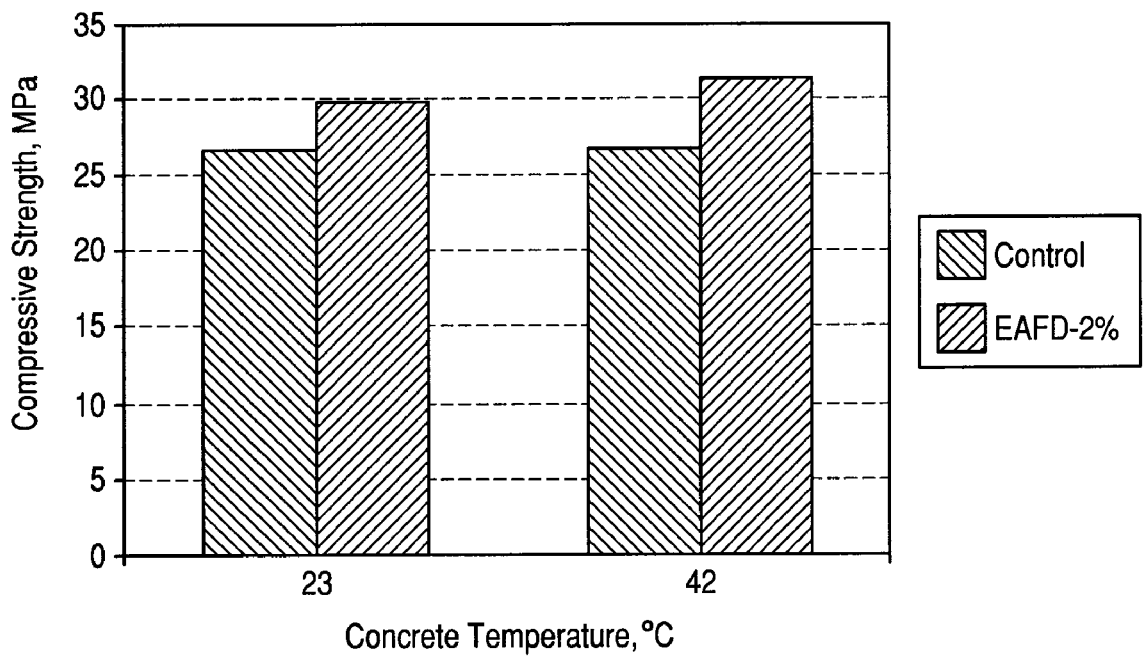
FIG. 3 is a graphical illustration showing the effect of temperature on the 28-day compressive strength of concrete cast with and without 2% Electric Arc Furnace Dust (EAFD)
Figure 4:
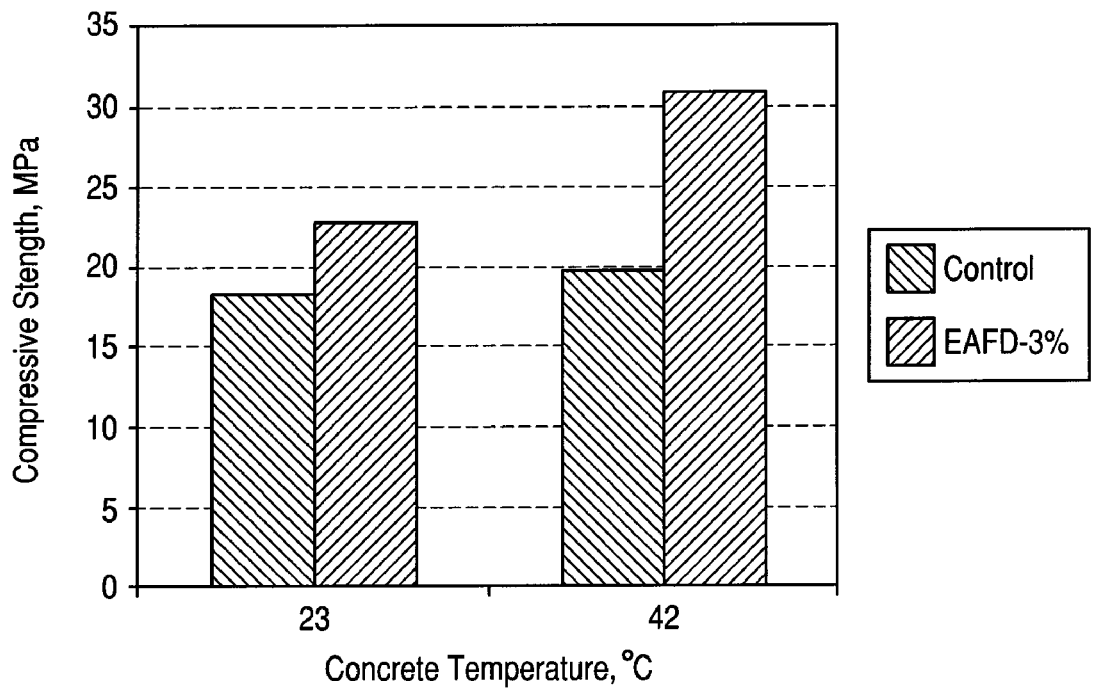
FIG. 4 is a graph illustrating the effect of temperature on the 7-day compressive strength of concrete with 3% Electric Arc Furnace Dust (EAFD) compared to a control (0% EAFD)
Figure 5:
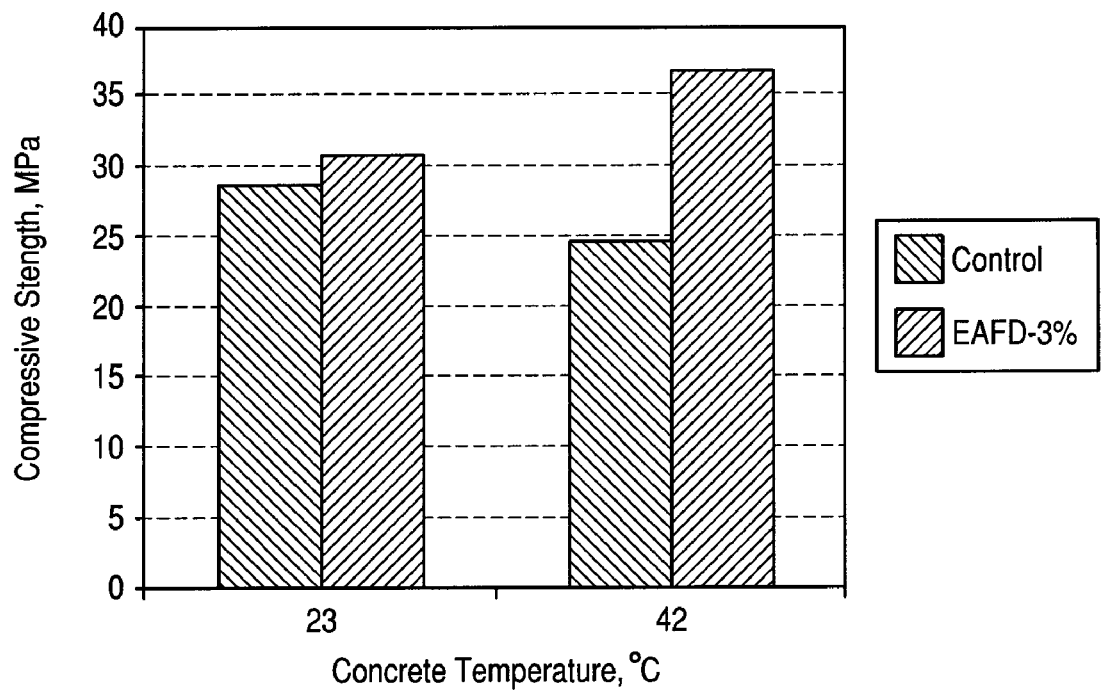
FIG. 5 is a graph illustrating the effect of temperature on the 28-day compressive strength of concrete with 3% Electric Arc Furnace Dust (EAFD) compared with a control of 0% EAFD.
Figure 6:
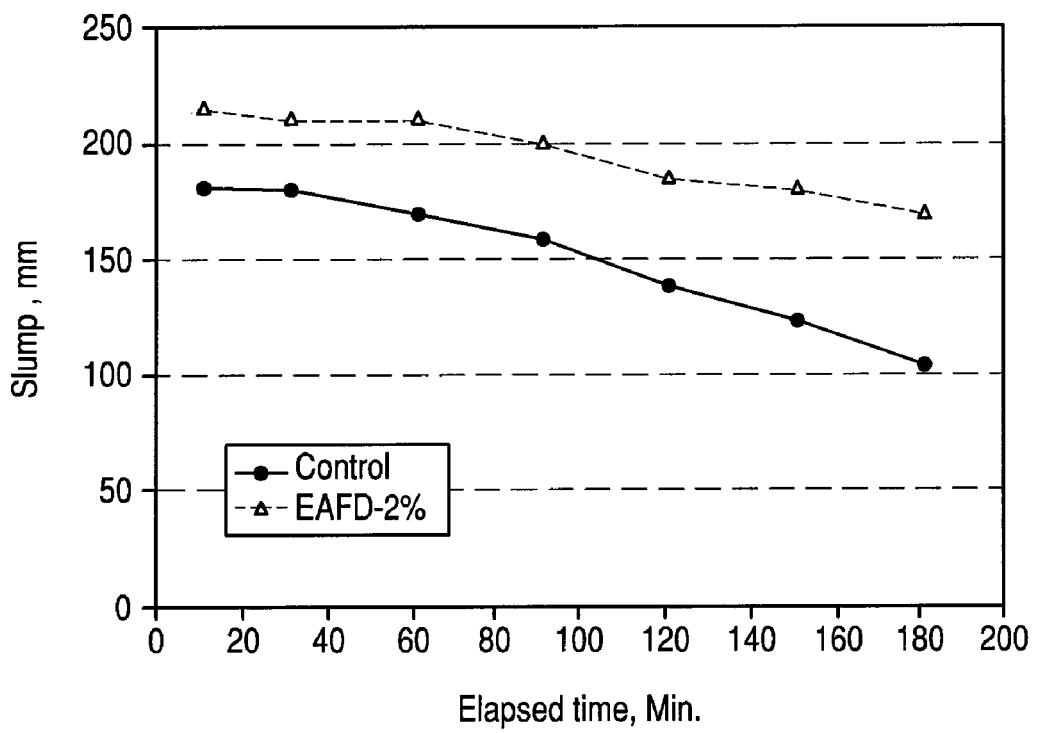
FIG. 6 is a graph illustrating the influence of the use of 2% Electric Arc Furnace Dust (EAFD) on slump versus time of concrete mixes cast at 23° C.
Figure 7:
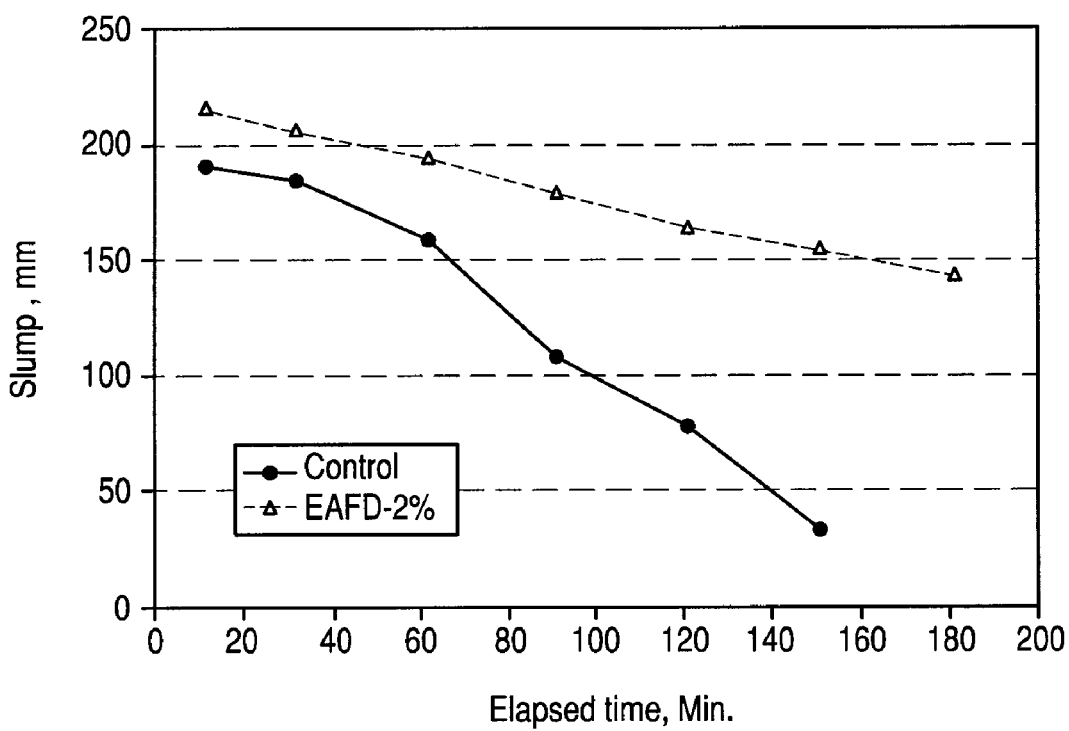
FIG. 7 is a graph illustrating the influence of the use of 2% Electric Arc Furnace Dust (EAFD) on slump versus time of concrete mixes cast at 42° C.
Figure 8:
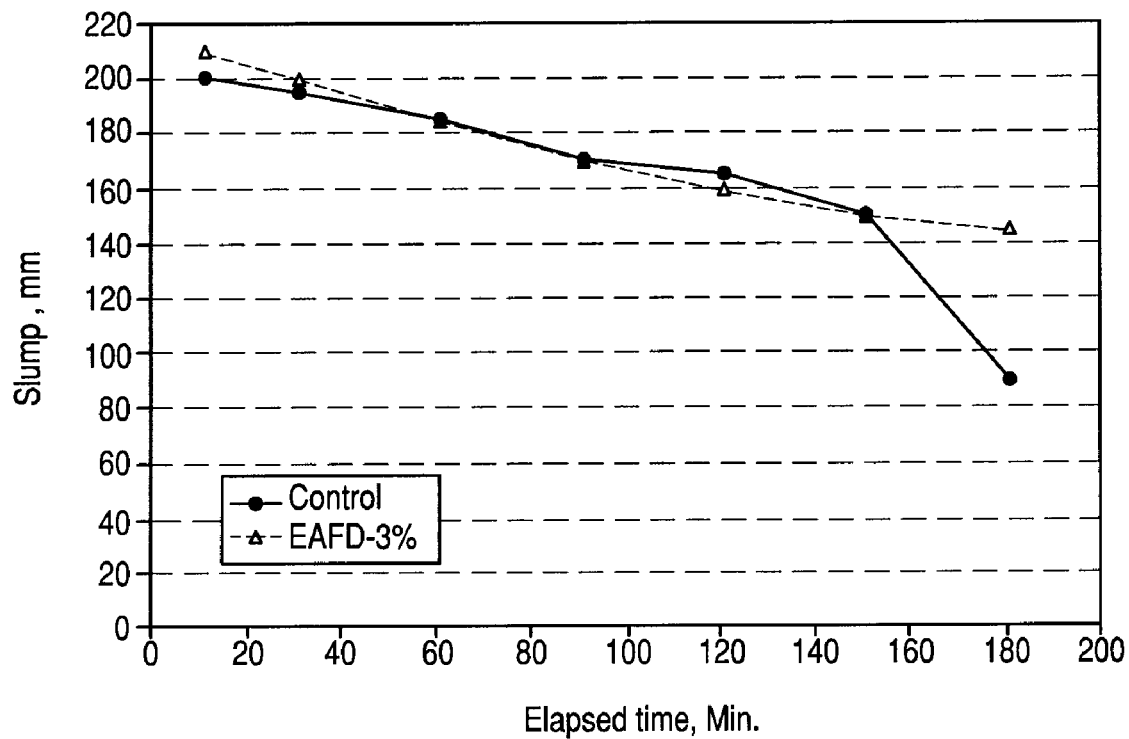
FIG. 8 is a graph illustrating the effect of 3% Electric Arc Furnace Dust (EAFD) on slump versus time of concrete mixes cast at 23° C.
Figure 9:
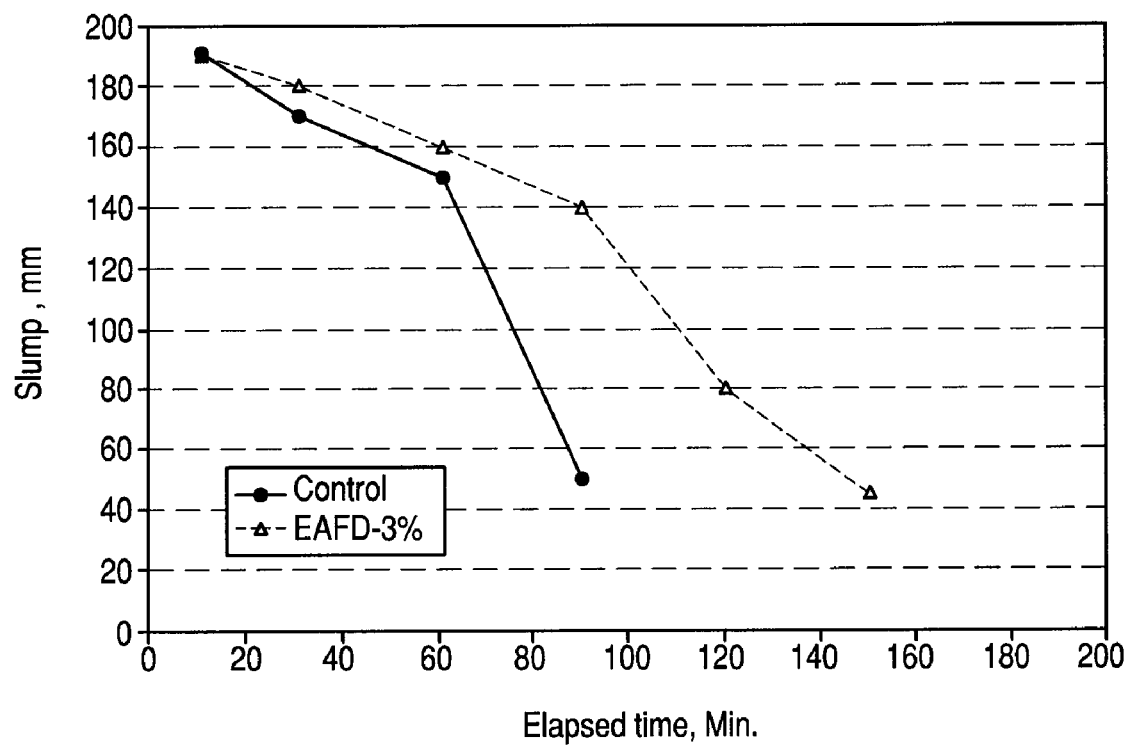
FIG. 9 is a graph illustrating the effect of 3% Electric Arc Furnace Dust (EAFD) on slump versus time of concrete mixes cast at 42° C.

The method in accordance with the preferred embodiment of the present invention is illustrated in FIG. 1 which includes a step 22 of providing masses or amounts of hydraulic cement, preferably Portland cement, masses of aggregate, masses of water and masses of electric arc furnace dust. The arc furnace dust is used as an additive but is also used as a replacement for a portion of the cement. For example, the EAFD is added in an amount of greater than 0% but less than or equal to 4%. In a preferred embodiment of the invention the portion of the cement equal to about up to 4% by weight is replaced with a like amount of electric arc furnace dust.

The method also includes the step 24 of heating the aggregate and water to a temperature of between 32° C. and 45° C. In practice, the heating step is provided naturally by an elevated ambient temperature and may at the same time heat the EAFD and the cement. In step 26 the cement, water, aggregate and EAFD are mixed in a 420 liter capacity mixer in accordance with ASTM C 192. In practice the EAFD was dispersed in the mixing water and thoroughly mixed in step 26. After mixing the mixture is cast in a suitable mold in step 28. The cast body was tested pursuant to ASTM C 39 for compressive strength. The following examples illustrate the various compositions in accordance with the present invention.

While the invention has been described in connection with the accompanying drawings, it should be recognized that changes and modifications may be made therein without departing from the scope of the appended claim.

What is claimed is:

1. A method for manufacturing concrete bodies including a mass of arc furnace dust at elevated temperatures to provide improved compressive strength and slump retention capability, said method comprising the steps of:

providing masses of hydraulic cement, aggregate, water and electric arc furnace dust (EAFD);

bringing the masses of aggregate and water to a temperature of between 32° C. and 45° C.;

mixing the masses of hydraulic cement, EAFD and heated water and heated aggregate to form a heated mixture with a temperature of between about 32° C. and about 45° C.;

casting the mixture at a temperature of between about 32° C. and 45° C. to produce a concrete form with improved compressive strength and slump retention capability; and in which a portion of the mass of cement is replaced by electric arc furnace dust in an amount of about 1% to less than or equal to 4% based on the amount of cement by weight.

2. A method for manufacturing concrete bodies containing a mass of arc furnace dust at elevated temperatures according to claim 1 in which the portion of the mass of cement is replaced by electric arc furnace dust in the amount from 1.5 to about 3% by weight.

3. The method for manufacturing concrete bodies containing a mass of arc furnace dust at elevated temperatures according to claim 1 in which the portion of the mass of cement is replaced by electric arc furnace dust in the amount of 1% to 3% by weight.

4. The method of manufacturing concrete forms containing a mass of arc furnace dust at elevated temperatures in accordance with claim 3 and wherein the cement used is Portland cement.

5. The method for manufacturing concrete bodies containing a mass of arc furnace dust at elevated temperatures in accordance with claim 4 and wherein the cement used is selected from the group consisting of Portland cement Type I, II, IV and V and mixtures thereof.

6. The method for manufacturing concrete bodies containing a mass of arc furnace dust at elevated temperatures in accordance with claim 5 wherein about 2% of cement has been replaced with electric arc furnace dust in a like amount.

7. The method for manufacturing concrete bodies containing a mass of arc furnace dust at elevated temperatures in accordance with claim 5 wherein about 3% of cement has been replaced with electric arc furnace dust in a like amount.

8. The method for manufacturing concrete bodies containing a mass of arc furnace dust at elevated temperatures in accordance with claim 5 wherein about 4% of cement has been replaced with electric arc furnace dust in a like amount.

9. A method for manufacturing concrete bodies including a mass of arc furnace dust at elevated temperatures to provide improved compressive strength and slump retention capability, said method consisting of the steps of:
   providing masses of hydraulic cement, aggregate, water and electric arc furnace dust (EAFD);
   bringing the masses of aggregate and water to a temperature of between 32° C. and 45° C.;
   mixing the masses of hydraulic cement, EAFD and heated water and heated aggregate to form a heated mixture with a temperature of between about 32° C. and about 45° C.;
   casting the mixture at a temperature of between about 32° C. and 45° C. to produce a concrete form with improved compressive strength and slump retention capability.

* * * * *